June 20, 1939. A. F. MOYER 2,162,783
GRASS CATCHING AND DISTRIBUTING DEVICE
Filed Dec. 30, 1936 3 Sheets-Sheet 1
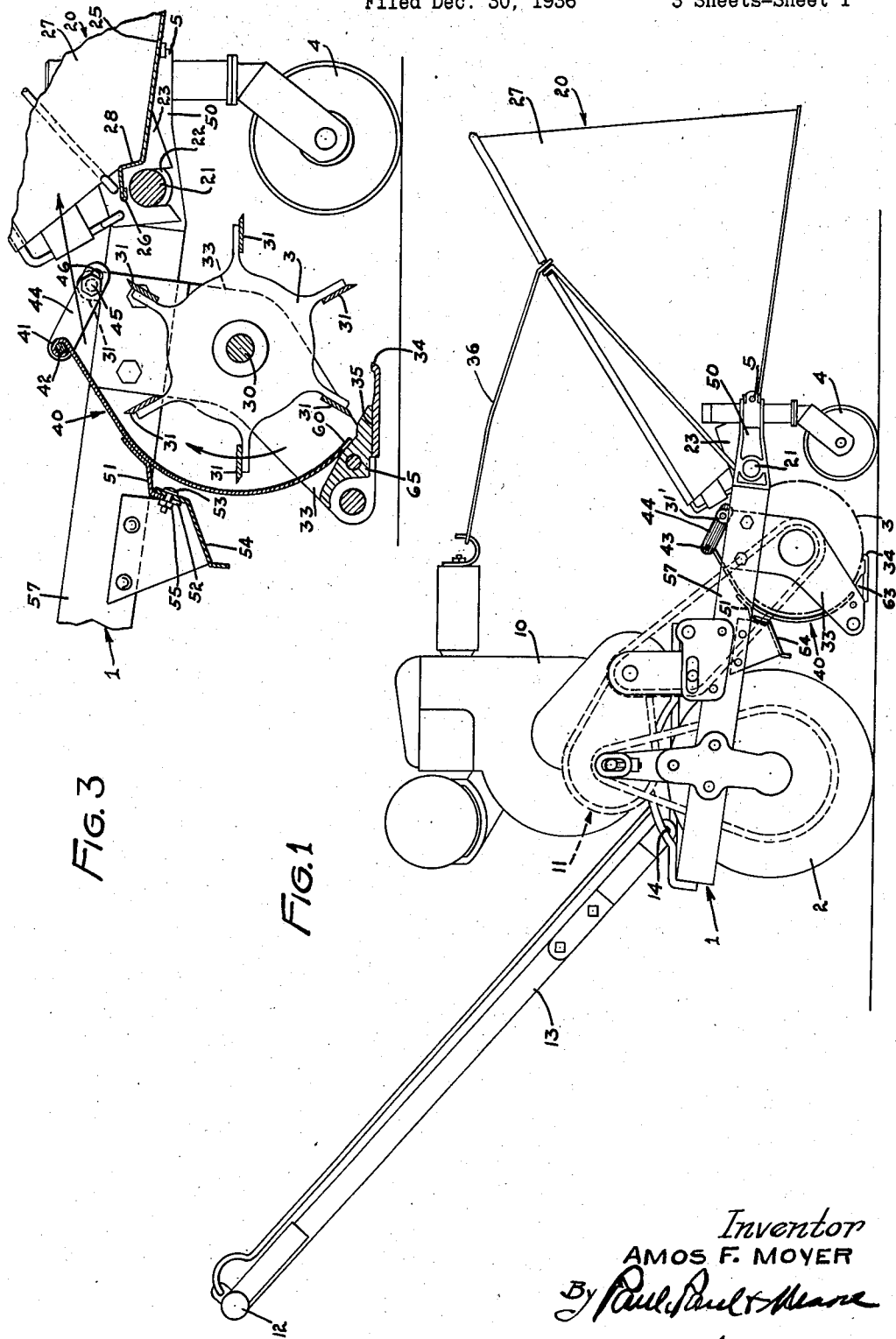
Inventor
AMOS F. MOYER
ATTORNEYS

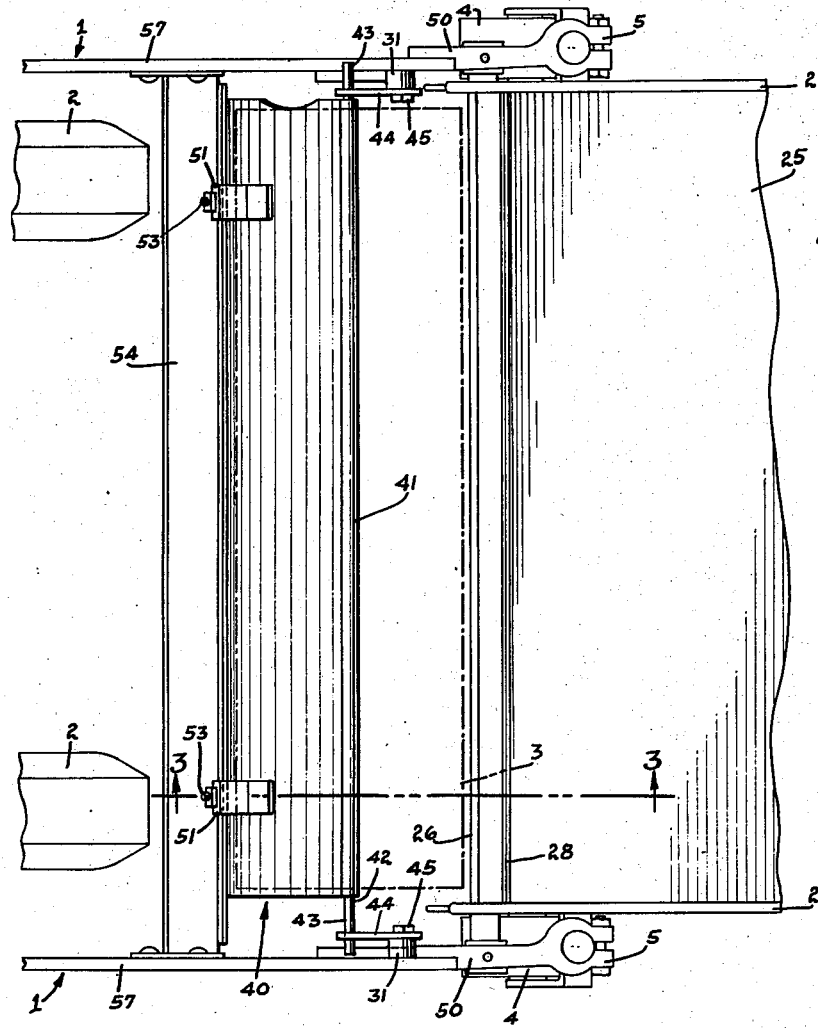

June 20, 1939.   A. F. MOYER   2,162,783
GRASS CATCHING AND DISTRIBUTING DEVICE
Filed Dec. 30, 1936   3 Sheets-Sheet 3
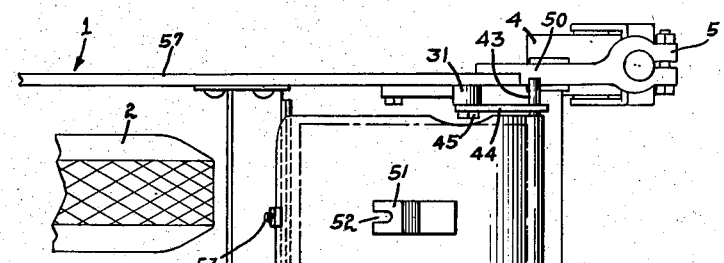
FIG.4
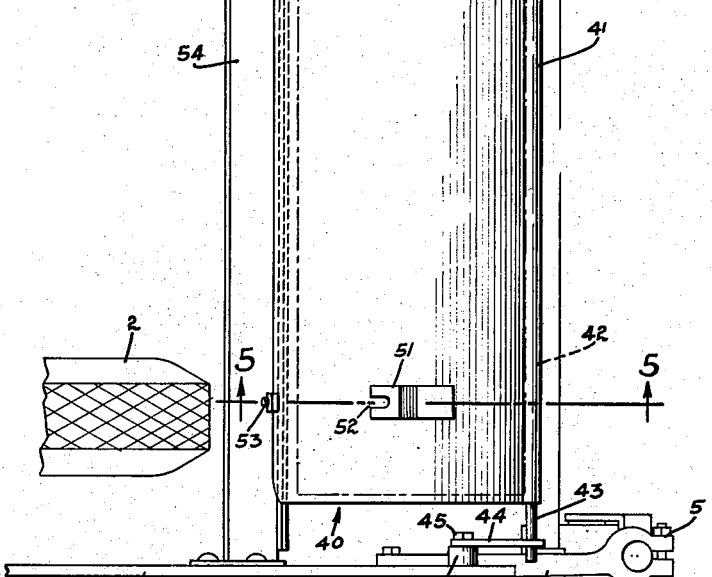
FIG.5
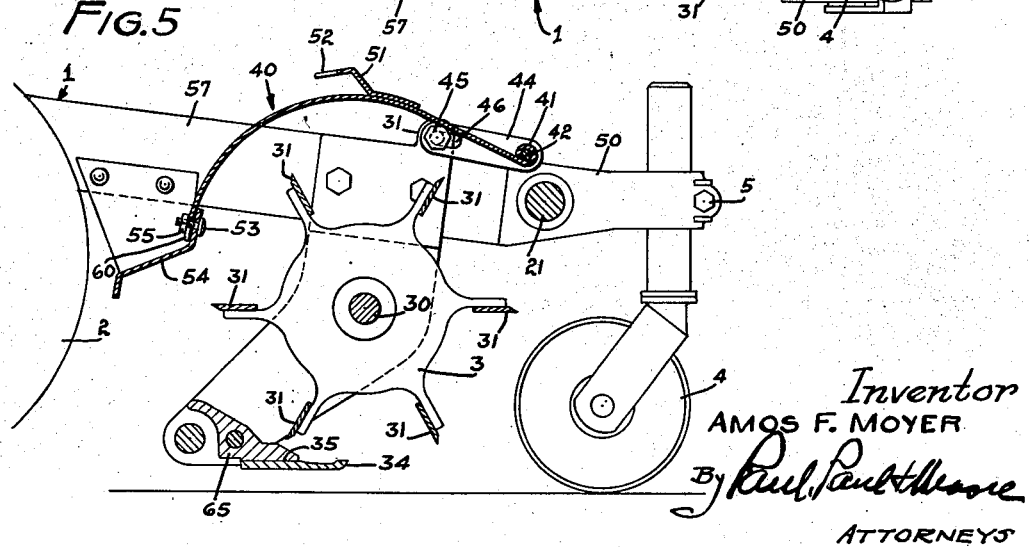
Inventor
AMOS F. MOYER
ATTORNEYS Patented June 20, 1939

2,162,783

UNITED STATES PATENT OFFICE 2,162,783

GRASS CATCHING AND DISTRIBUTING DEVICE

Amos F. Moyer, Minneapolis, Minn., assignor to Toro Manufacturing Corporation of Minnesota, Minneapolis, Minn., a corporation of Minnesota Application December 30, 1936, Serial No. 118,340

11 Claims.  (Cl. 56—23)

This invention relates to grass catching and deflecting devices for mowers, generally but not necessarily, of the type having rearwardly positioned ground wheels and a forwardly positioned rotary cutter. The device is particularly applicable to mower units which are engine-driven, that is, to power type mowers.

The main object of the invention is to provide a single device by which the grass, after being cut, is optionally distributed on the turf or directly forwarded into a grass catcher. An important object is to provide a deflector which can be quickly adjusted to and held in deflecting or non-deflecting positions, and which constitutes a protecting shield above the rotary cutter, when held in non-deflecting position.

In devices of this kind it is desirable to have a deflector which is a permanent part of the unit, and which can be quickly adjusted from one position to another without detachment. The present invention provides a structure which is relatively simple, and which is inexpensive to make and to apply.

As a protecting shield, when in non-deflecting position, any grass clippings which may by chance be carried over the top cutter instead of being thrown out behind, are prevented from being carried by the wind and deposited in undesirable positions on the mower.

Features of the invention include the use of such an adjustable deflector; the connection of the deflector in a manner to allow forward and rearward adjustment of the same; the use of a shiftable connection allowing adjustment by translation or arcuate motions; the use of slots as stops for registration with a corresponding stop of the frame of the unit, to secure the deflector alternately in two positions; the last mentioned feature in combination with means by which arcuate swinging motions can be had for adjusting the position; and all details of construction and specific arrangements and specific connections along with all broader ideas of means inherent in or derivable from the disclosure.

Objects, features and advantages of the invention will appear in the description of the drawings, and in said drawings:

Figure 1 is a side elevation, partly diagrammatic, showing one type of machine to which this invention is applied, and showing the deflector in deflecting position whereby to cause the cut grass to be directed into a forwardly disposed grass catcher.

Figure 2 is a plan view of the forward portion of Figure 1, illustrating the shift connections for the deflector;

Figure 3 is a detail vertical cross-section on line 3—3 of Figure 2 showing the deflector in deflecting position;

Figure 4 is a plan view showing the deflector in non-deflecting position;

Figure 5 is a detail vertical cross-section on line 5—5 of Figure 4; and

Figure 6 is a perspective view of the deflector.

In the drawings, numeral 1 generally indicates the frame of a mowing implement or unit having ground wheels 2, a cutter or cutter reel 3, and having castor wheels 4 which are vertically adjustable to regulate depth of the cut. Suitable clamping means 5 secures the wheel mounts in adjusted position. This unit is motor driven, the motor being indicated at 10. The various driving connections are generally diagrammatically indicated at 11 and include connections for driving the ground wheels 2, and connections for driving the cutter 3 along with suitable clutches, etc. These driving connections form no part of the present invention. An operating and control handle is indicated at 12, the same being arranged crosswise of a swinging bar 13 suitably pivoted at 14 to the frame 1.

Arranged at the forward side of the unit is a grass catcher generally indicated at 20. The catcher may be of any preferred form. The catcher is connected at its rear end, see Figure 3, to a cross bar 21 of the mower frame by means of downwardly opening slots 22 of plates 23. These plates are suitably secured to the sides 27 of the catcher structure. The bottom of the catcher is indicated at 25 and its rear edge at 26. A jog 28 is provided in the bottom 25, near the rear edge, to resist rearward travel of the grass in the catcher. The catcher is supported on the bar 21, and by a rod 36 connecting with a projecting portion of the motor 10.

The bar 21 is arranged forwardly of the cutter as shown, and the rear end of the catcher of course is open to receive grass which is directed thereinto. The shaft of the cutter is indicated at 30; the knives are indicated at 31. The shaft 30 is suitably journaled in side brackets 33 depending from the side members of the frame. The stationary cutter blade is indicated at 34 and is suitably mounted on bed plate 35.

The castors 4 are vertically adjustable to regulate the depth of the cut. The reel rotates in direction of the arrow shown in Figure 3, and the tangential motion of the reel blades is imparted to the clippings.

The deflector of this invention is generally indicated by numeral 40 and although the specific structure is claimed, the broader function of adjustability is also claimed. The forward end or edge of the deflector is turned to provide an elongated bearing eye 41, and into this eye extend pintles 42 having portions 43 projecting at opposite sides and traversing links 44, which are swingingly attached to the frame by means of pivot bolts 45, passing loosely through slots 46 of the links to allow swinging and translation of said links. The bolts 45 in this instance are carried by the brackets 31' in which the cutter reel shaft is journaled. When deflector 40 is in deflecting position, as shown in Figure 3, the combination of slots 46 with bolts 45 permits adjustment of the angular position of the upper portion of deflector 40 so as to cause the clippings to be thrown at the desired height when being delivered into catcher 27. The maximum useful capacity of the catcher is obtained when the clippings are thrown against the top portion of the forward wall of the catcher without passing above the top edge.

By means of the links a swingable and translatable connection is provided, which allows the deflector to be arcuately shifted, from the deflecting position of Figure 3 to the upper and forward or non-deflecting position of Figure 5. When in the position of Figure 5 the forward edge of the deflector is supported by engagement of the projections 43 with the brackets 50 which support the castors. These elements 43 and 50 thus act as stops to limit downward movement of the forward portion of the deflector. The deflector is held or supported in alternate deflecting and non-deflecting or shielding position, see Figures 3 and 4, by means of stops or latches which in this embodiment are formed in part by open-slotting brackets 51 of the deflector as at 52. These slots engage bolts 53 of the cross piece 54 as stops. These bolts have nuts 55 which when tightened secure the parts in deflecting position as shown in Figure 3. The cross plate 54 has upturned ends which are attached to the side members 57 of the frame. It can be seen from Figure 3 that the cuttings are thrown rearwardly then upwardly and forwardly in direction of the arrows and into the grass catcher. It is noted that the catcher is supported on a bar 21 which is carried by the castor-supporting brackets 50.

Referring to Figure 5 in which the deflector is shown in non-deflecting or shielding position, the forward end of the deflector is held from downward movement by means of stops 43 engaging the members 50.

The rear lower edge of the deflector has stops, as slots 60, so spaced as to register with the bolts 53 so that these bolts form stops for alternately receiving the slots 52 and 60. The slots 46 of the links permit slight forward motion as shown in Figure 5 to allow proper disposition of the deflector in non-deflecting position.

It will be noted that when deflector 40 is engaged by slots 60 with bolts 53 on plate 54, there is a substantial open space above and behind knife bar 35, into which the clippings are tangentially thrown and thence distributed upon the turf, and that plate 54 and deflector 40 form a closed covering above and partially behind the reel, whereby any stray clippings that may be carried upward by the reel blades are prevented from drifting and lodging in undesired positions on the mower, such as on the motor, clutches, drive chains, etc.

Referring to Figure 3, the parts are so arranged that when in deflecting position the lower edge of the deflector 40 nearly or lightly engages the cutter bar support 65, and at this time the inner ends of the slots 46 abut the bolts 45 making the forward edge of the deflector rigid. Thus, the connection at 52 holds the device in non-vibrating condition. This is a feature of the invention. The same is true for the position of Figure 5, it being understood that for both positions of the deflector the nuts 55 of the bolts 53 are tightened to obtain rigidity.

It will be understood of course that I do not limit the invention entirely to the details of construction although these are claimed along with the broader ideas of means.

I believe myself the first to provide any scheme whereby deflectors for this purpose can be so quickly and easily shifted from one position to another, and held rigidly in either position, and the first to make a deflector which has a swinging adjustment and which is permanently attached, as in this case.

I claim as my invention:

1. In combination with a mower unit including a plurality of cutters mounted for movement along a curved path and a cooperating stationary cutting element, a delivery scroll, including a curved segment alongside the path of movement of the movable elements, a discharge lip for the scroll, and link means for positioning the delivery scroll on the mower unit.

2. In combination with a mower unit including a plurality of cutters mounted for movement along a curved path and a cooperating stationary cutting element, a delivery scroll, including a curved segment alongside the path of movement of the movable elements, a discharge lip from the scroll, and means including pivotal links connecting the delivery scroll and the mower unit.

3. A mowing machine comprising a frame, a plurality of cutting elements rotatably mounted on said frame for movement about a cylindrical path, a stationary cutting blade mounted on said frame for cooperation with the rotatable cutting elements, and a delivery scroll for the cuttings resulting from operation of said mower, including a curved apron substantially parallel with and positioned closely adjacent a portion of the cylindrical path of the rotatable blades, one end of the apron being formed with a discharge lip, and adjustable bracket means for positioning the apron adjacent the stationary cutter bar and for alternatively holding the apron in a position removed from the stationary cutter bar.

4. A mowing machine comprising a frame, a plurality of cutting elements rotatably mounted on said frame for movement about a cylindrical path, a stationary cutting blade mounted on said frame for cooperation with the rotatable cutting elements, and a delivery scroll for the cuttings resulting from operation of said mower, including a curved apron substantially parallel with and positioned closely adjacent a portion of the cylindrical path of the rotatable blades, one end of the apron being formed with a discharge lip, and means, including a link connected to the apron and pivoted with respect to the frame for adjustably positioning the apron with respect to the frame.

5. A mowing machine comprising a frame, a plurality of cutting elements rotatably mounted on said frame for movement about a cylindrical path, a stationary cutting blade mounted on said frame for cooperation with the rotatable cutting elements, and a delivery scroll for the cuttings resulting from operation of said mower, including a curved apron substantially with and positioned closely adjacent a portion of the cylindrical path of the rotatable blades, one end of the apron being formed with a discharge lip, means including a link connected to the apron and pivoted with respect to the frame for adjustably positioning the apron with respect to the frame, and means for adjustably fastening the link means in a plurality of adjusted positions.

6. A mowing machine comprising a frame, a plurality of cutting elements rotatably mounted on said frame for movement about a cylindrical path, a stationary cutting blade mounted on said frame for cooperation with the rotatable cutting elements, and a delivery scroll for the cuttings resulting from operation of said mower including a curved apron substantially with and positioned closely adjacent a portion of the cylindrical path of the rotatable blades, one end of the apron being formed with a discharge lip, said apron being formed for quick detachable engagement with the stationary cutting bar.

7. A mowing machine comprising a frame, a plurality of drive wheels for carrying said frame, a plurality of cutting elements mounted for rotation about a cylindrical path on said frame, a stationary cutting blade mounted on said frame for cooperation with the rotatable cutting elements, motor means and power transmitting means for driving said drive wheels and said rotatably mounted cutting elements, a curved apron substantially parallel with and positioned closely adjacent a portion of the cylindrical path of rotation of said rotatable blades and adjustable fastening means for alternatively positioning the apron adjacent the stationary cutting blade or in a position above and removed from the stationary blade in a position to shield the motor means and power transmitting means from impelled cuttings.

8. In a lawn mower comprising a frame, a cutting reel and a grass catcher located out of the normal path of discharge of the major portion of the clippings from the cutting reel, a curved deflector connected to the frame, and shiftable means for holding the deflector in a first position in which an edge of said deflector intersects the normal path of discharge of the clippings from the cutting reel catcher, and a second position in which said edge is outside of the normal path of discharge of the major portion of the clippings from the cutting reel.

9. A lawn mower comprising a frame, a cutting reel and a grass catcher located out of the normal path of discharge of the clippings from the cutting reel, a curved deflector connected to the frame, and shiftable means for selectively mounting the deflector either in a position behind the reel or in a position above the reel.

10. A power lawn mower comprising a frame, a revolvable cutter mounted on the frame, a receptacle for cuttings mounted ahead of the revolvable cutter, a motor carried on the frame above the cutter, a fixed shield horizontally disposed between the motor and the revolvable cutter, said shield being of a size such as partially to protect the motor from stray clippings, and an adjustable curved deflector means for mounting said deflector on the frame with an edge of said deflector tangential to and in a position to intercept clippings discharged from said revolvable cutter and for alternatively mounting said deflector in an upper position closely adjacent and above the cutter with said edge out of the path of discharge of clippings so as to intercept stray clippings and protect the motor, and to discharge the clippings rearwardly onto the turf.

11. A mowing machine, including a frame, a stationary cutting blade mounted on said frame, a cutting reel rotatably mounted on said frame for cooperation with said blade, and a receptacle for lawn clippings, an adjustable guide for said clippings comprising a curved portion and a discharge lip, and mounting means to hold the guide with an edge thereof in a position to intercept said clippings and with the discharge lip directed toward said receptacle said guide being of a material capable of being deformed under tension, and an adjustable mounting for varying the position of the discharge lip with respect to the frame.

AMOS F. MOYER.